(12) United States Patent
Braggs

(10) Patent No.: US 12,399,990 B2
(45) Date of Patent: Aug. 26, 2025

(54) VARIABLE TIMEOUTS BETWEEN OPERATING MODES OF A COMPUTER FOR DETECTING MALICIOUS SOFTWARE

(71) Applicant: Sophos Limited, Abingdon (GB)

(72) Inventor: Steven John Braggs, Oxford (GB)

(73) Assignee: Sophos Limited (GB)

( * ) Notice: Subject to any disclaimer, the term of this patent is extended or adjusted under 35 U.S.C. 154(b) by 192 days.

(21) Appl. No.: 17/986,163

(22) Filed: Nov. 14, 2022

(65) Prior Publication Data

US 2024/0160734 A1  May 16, 2024

(51) Int. Cl.
*G06F 21/56* (2013.01)
*G06F 21/51* (2013.01)

(52) U.S. Cl.
CPC .............. *G06F 21/56* (2013.01); *G06F 21/51* (2013.01); *G06F 2221/033* (2013.01)

(58) Field of Classification Search
CPC .......... G06F 21/51; G06F 21/54; G06F 21/55; G06F 21/56; G06F 21/554; G06F 21/564; G06F 21/565; G06F 21/566; G06F 21/568; G06F 21/577; G06F 2221/033; G06F 9/442; G06F 3/0622; G06F 3/0655; G06F 3/0679
USPC .......................................................... 726/24
See application file for complete search history.

(56) References Cited

U.S. PATENT DOCUMENTS

| | | | |
|---|---|---|---|
| 9,355,247 B1 * | 5/2016 | Thioux | G06F 21/53 |
| 2004/0064712 A1 * | 4/2004 | Arthur | G06F 21/51 |
| | | | 713/193 |
| 2012/0079596 A1 * | 3/2012 | Thomas | H04L 63/1433 |
| | | | 726/24 |
| 2014/0173144 A1 * | 6/2014 | Kobashi | G06F 3/0673 |
| | | | 710/38 |
| 2016/0004599 A1 * | 1/2016 | Mam | G06F 11/14 |
| | | | 711/162 |
| 2017/0091452 A1 * | 3/2017 | Sallam | G06F 21/56 |
| 2020/0394295 A1 * | 12/2020 | Ikram | G06F 21/566 |
| 2021/0026800 A1 * | 1/2021 | Hahn | G06F 3/0619 |
| 2021/0173588 A1 * | 6/2021 | Kannan | G06F 3/061 |
| 2021/0334363 A1 * | 10/2021 | Kim | G06F 21/54 |
| 2022/0100854 A1 * | 3/2022 | Ahmed | G06F 21/56 |
| 2022/0129551 A1 * | 4/2022 | Collier | G06F 21/565 |
| 2022/0284095 A1 * | 9/2022 | Ahmed | G06F 21/554 |

(Continued)

*Primary Examiner* — James N Fiorillo

(74) *Attorney, Agent, or Firm* — Schmeiser, Olsen & Watts LLP; Timothy P. Collins, Esq.

(57) ABSTRACT

A method for detecting malicious activity of a computing device comprises detecting, by a software driver executing within a kernel mode of an operating system being executed by the computing device, an operation performed at the computing device; intercepting the operation; receiving, by a security application executing within a user mode of the operating system, a request from the software driver for an instruction for the software driver for an action to block or allow the operation according to a first timeout value; generating a second timeout value based on an amount of time determined by the security application; transmitting a reply to the request that includes the second timeout value to the software driver; transmitting the instruction to the software driver in compliance with the second timeout value; and executing, by the software driver, the action in response to the instruction.

15 Claims, 7 Drawing Sheets

(56) References Cited

U.S. PATENT DOCUMENTS

2022/0292194 A1* 9/2022 Edwards ................ G06F 9/485
2023/0367713 A1* 11/2023 Radi .................. G06F 12/0824

* cited by examiner

VARIABLE TIMEOUTS BETWEEN OPERATING MODES OF A COMPUTER FOR DETECTING MALICIOUS SOFTWARE

FIELD

The present disclosure relates to generally to computer security software. More specifically, the present disclosure describes anti-malware software having kernel mode and user mode components that exchange data according to a variable timeout mechanism to protect a computer against malicious software.

BACKGROUND

Modern computers rely on security software to proactively identify and prevent potential security threats, for example, providing protection against malicious software ("malware"), which is used to perform cyberattacks or other unauthorized operations on the computers of users or entities such as businesses, schools, or governments. Anti-malware code may execute in a kernel mode and/or a user mode of a computer's operating system to protect the operating system against malware.

The user mode provides an environment for users to run user mode objects such as programs, for example, software applications or the like. In doing so, the user mode relies on software components, e.g., kernel objects such as software drivers, located in the address space of the operating system to execute critical tasks involving computer hardware resources. When the kernel driver intercepts an operation, for example, corresponding to a thread of a process executed by the operating system, the kernel driver requests an instruction from the software application regarding the operation, namely, whether to allow the operation to proceed or block the operation. When the request is initiated from the software driver to the user application, a timer can be activated. The kernel driver may be configured to perform a default action if it does not receive a reply with an instruction from the application within a predetermined amount of time established by a timeout value of the timer. A default action may include a fail closed security event where the kernel mode blocks the event or a fail open security event where the kernel driver allows the event to proceed.

A fixed timeout may cause the kernel mode driver to perform a default action prematurely and result in malware being missed or unidentified since anti-malware software may not have sufficient time to analyze the operation of interest to determine its integrity. A timeout that is too long, on the other hand, can result in the computer locking up for a significant period of time, for example, due to the user mode application failing to reply because it has crashed or is too busy processing other events to respond. In some instances, the machine may deadlock for the period of the timeout.

SUMMARY

According to embodiments disclosed herein, a method, and associated computer system and computer program product for detecting malicious activity of a computing device is provided. A software driver executing within a kernel mode of an operating system being executed by the computing device detects an operation performed at the computing device. The software driver intercepts the operation. A security application executing within a user mode of the operating system receives a request from the software driver for an instruction for the software driver for an action to block or allow the operation according to a first timeout value. The security application generates a second timeout value based on an amount of time determined by the security application. The security application transmits a reply to the request that includes the second timeout value to the software driver. The security application transmits the instruction to the software driver in compliance with the second timeout value. The software driver executes the action in response to the instruction.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
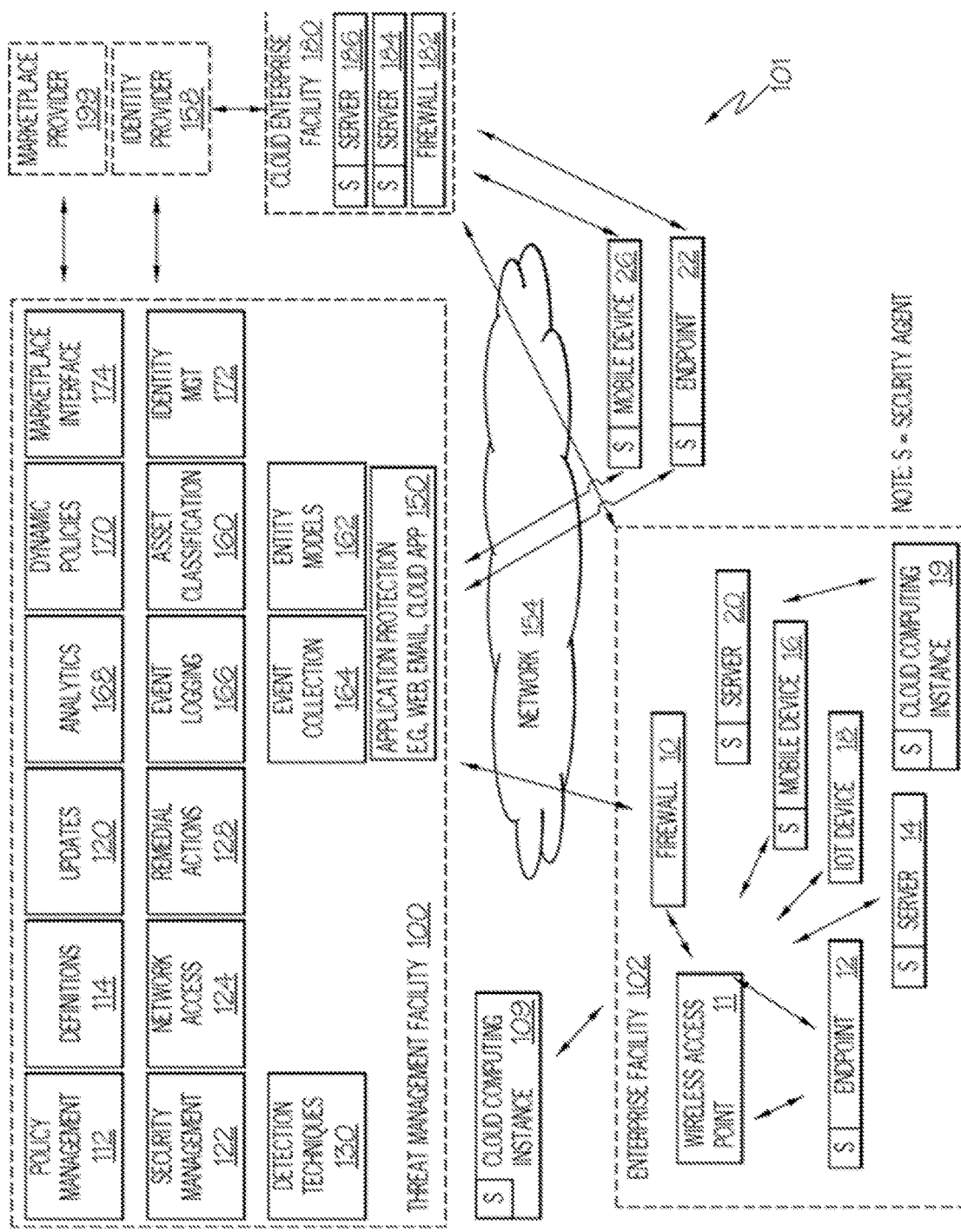
FIG. 1 depicts a block diagram of a threat management facility, in accordance with an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The disclosed concepts and features are described in more detail with reference to exemplary embodiments thereof as shown in the accompanying drawings. While the various concepts and features are described in conjunction with various embodiments and examples, it is not intended that the concepts and features are limited to such embodiments. On the contrary, the various concepts and features encompasses various alternatives, modifications and equivalents, as will be appreciated by those of skill in the art. Those of ordinary skill having access to the concepts described herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein are directed to a variable timeout feature used by a kernel mode object, e.g., a software driver, to establish a period of time when the kernel mode software driver can expect to receive an instruction from a user mode regarding an operation corresponding to a program being executed temporarily halted or otherwise prevented from executing by the kernel mode software drivers. As used herein, a program may be part of an application, utility, or a combination thereof. The variable timeout feature can be particularly beneficial in protecting a computer against malicious software because the timeout can be established according to an amount of time required by an application to analyze an operation currently on hold by the kernel driver. In particular, the kernel mode software drivers are configured to intercept event-related operations on the computer, for example, intercept an open file operation, a process startup, or other operation performed by routines of the like in the user mode. For example, a driver may be configured to suspend an operation while a security application executing at the user mode performs a malware analysis on the operation and establishes whether the operation is permissible.

The timing of responses received in a communication exchange between the user mode object and kernel mode object is important for the efficacy of a security application executed by the operating system in guarding against threats from malware. In doing so, the kernel mode object prevents an operation from occurring until it receives an instruction from the user mode object to perform a particular action, for example to either Hock the operation or to allow the operation and can therefore prevent malicious software attacks from succeeding at the computing device.

FIG. 1 depicts a block diagram of a threat management system 100 providing protection against a plurality of threats, such as malware, viruses, spyware, cryptoware, adware, Trojans, spam, intrusion, policy abuse, improper configuration, vulnerabilities, improper access, uncontrolled access, code injection attacks, and more according to an example embodiment. The threat management facility 100 may communicate with, coordinate, and control operation of security functionality at different control points, layers, and levels within the facility 100. A number of capabilities may be provided by the threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats or unwanted activity. In embodiments, the threat management facility 100 may provide protection from a variety of threats or unwanted activity to an enterprise facility that may include a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management facility 100, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with a cloud enterprise facility 180. The cloud enterprise facility may include one or more cloud applications, such as a SaaS application, which is used by but not operated by the enterprise facility 102. Exemplary commercially available SaaS applications include Salesforce, Amazon Web Services (AWS) applications, Google Apps applications, Microsoft Office 365 applications and so on. A given SaaS application may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

The cloud enterprise facility 180 may include servers 184, 186, and a firewall 182. The servers 184, 186 on the cloud enterprise facility 180 may run one or more enterprise or cloud applications, such as SaaS applications, and make them available to the enterprise facilities 102 compute instances 10-26. It should be understood that there may be any number of servers 184, 186 and firewalls 182, as well as other compute instances in a given cloud enterprise facility 180. It also should be understood that a given enterprise facility may use both SaaS applications and cloud enterprise facilities 180, or, for example, a SaaS application may be deployed on a cloud enterprise facility 180.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

While the above description of the threat management system 100 describes various threats typically coming from a source outside the enterprise facility 102, it should be understood that the disclosed embodiments contemplate that threats may occur to the enterprise facility 102 by the direct actions, either intentional or unintentional, of a user or employee associated with the enterprise facility 102. Thus, reference to threats hereinabove may also refer to instances where a user or employee, either knowingly or unknowingly, performs data exfiltration from the enterprise facility 102 in a manner that the enterprise facility 102 wishes to prevent.

Figure 2:
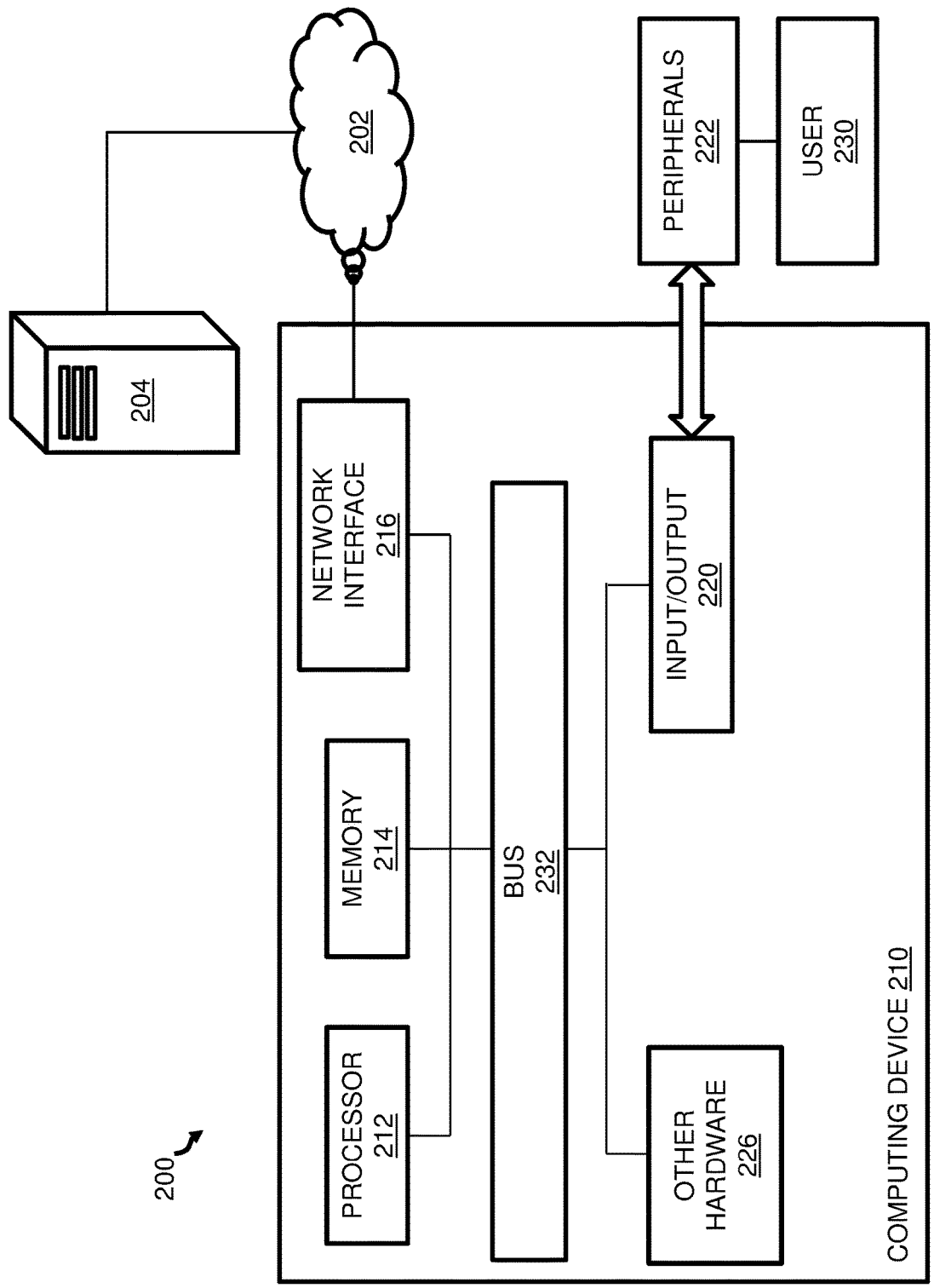
FIG. 2 depicts a computer system, in accordance with an example embodiment.

FIG. 2 illustrates a computer system according to an example embodiment. In general, the computer system 200 may include a computing device 210 connected to a network 202, e.g., through an external device 204. The computing device 210 may be or include any type of network endpoint or endpoints as described herein, e.g., with reference to the threat management system 100 of FIG. 1. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include a network described herein, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 210 and configuring the computing device 210 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

In some embodiments, the memory 214 may include a data store, e.g., internal memory store providing a computer-readable medium such as a disk drive, an optical drive, a magnetic drive, a flash drive, or other device capable of providing mass storage for the computing device 210. Here, the data store may store computer readable instructions, data structures, program modules, and other data for the computing device 210 or computer system 200 in a non-volatile form for subsequent retrieval and use. For example, the data store may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 210. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 210 may be used as a peripheral 222 as contemplated herein.

Other hardware 226 may be incorporated into the computing device 210 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 210 such as the processor 212, memory 214, network interface 216, other hardware 226, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 210 may be deployed as a number of parallel processors synchronized to execute code together for improved performance, or the computing device 210 may be realized in a virtualized environment where software on a hypervisor or other virtualization management facility emulates components of the computing device 210 as appropriate to reproduce some or all of the functions of a hardware instantiation of the computing device 210.

Figure 3:
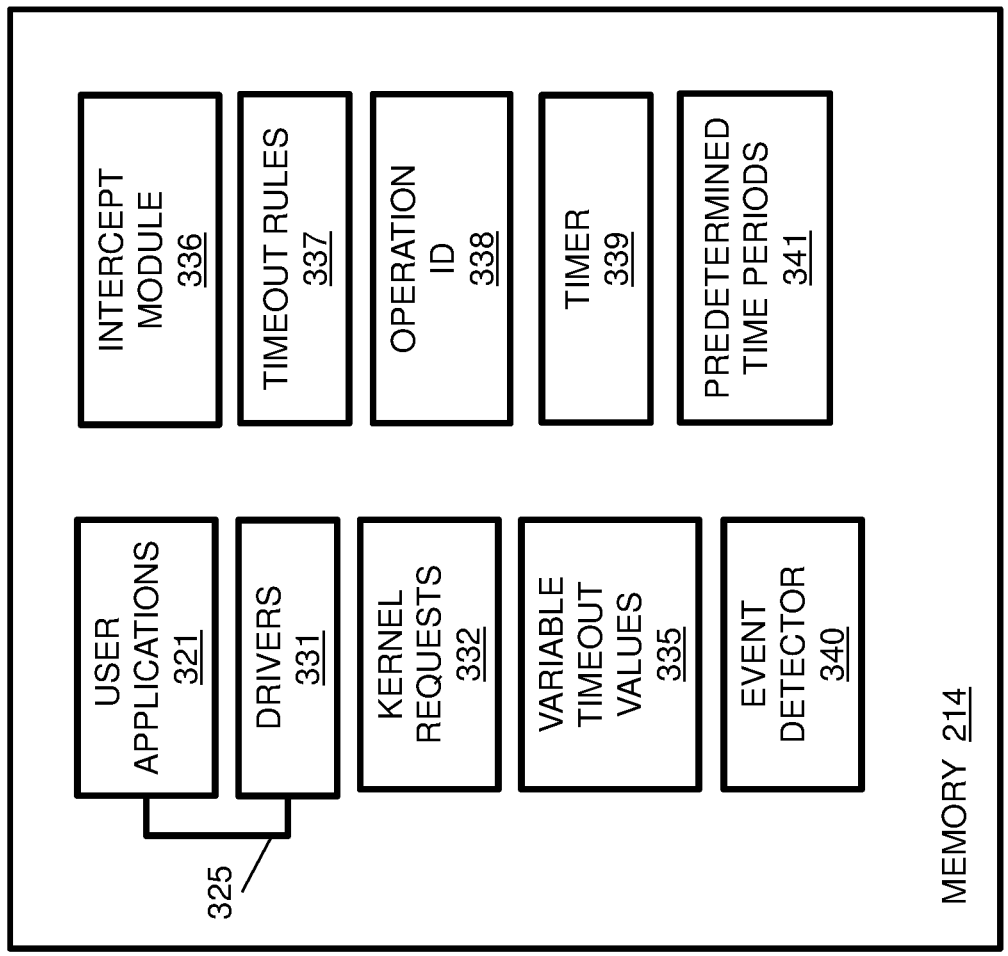
FIG. 3 depicts a diagram of a memory of the computer system of FIG. 2, in accordance with an example embodiment.
Figure 4:
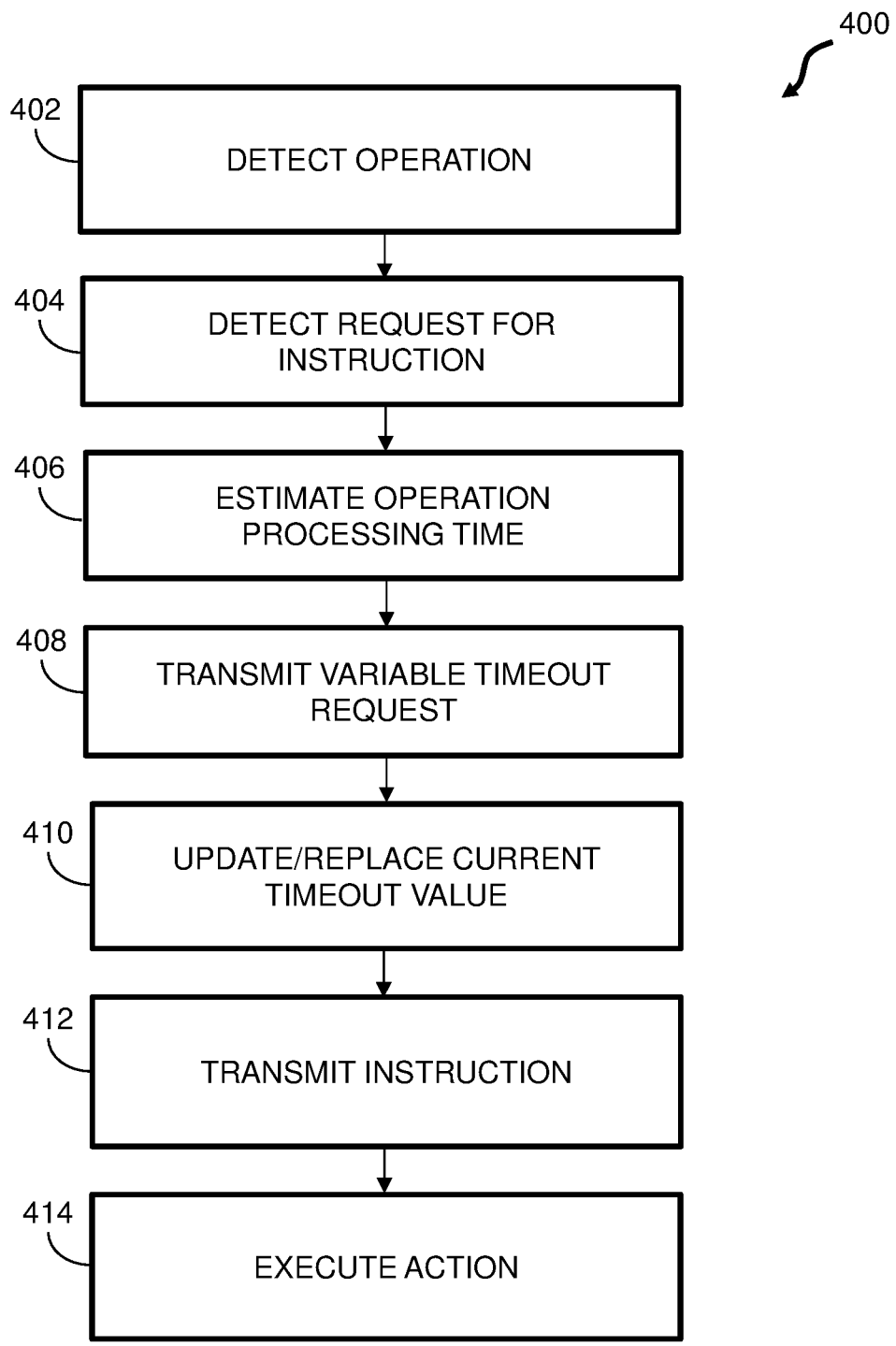
FIG. 4 depicts a method for detecting malicious activity on a computing device, in accordance with an example embodiment.

Referring to FIG. 3, with further regard to the memory 214, the memory 214 can store, for example, code of one or more software applications, modules, programs, or the like that includes instructions to cause the processor 212 to perform one or more processes, functions, and/or the like, for example, some or all of the method 400 of FIG. 4. As shown in FIG. 3, the memory 214 can store one or more user applications 321, kernel requests 332, variable timeout values 335 (referred to generally as variable timeouts), operation intercepts 336, timeout rules 337, operation reference identifications (ID) 338, timers 339, detected events 340, and predetermined time period values 341. The user applications 321 may be user mode components. Some or all of the kernel requests 332, variable timeouts 335, intercepts 336, timeout rules 337, operation reference identifications (ID) 338, timers 339, detected events 340, and predetermined time period values 341 may be executed in a kernel mode, for example, by a kernel driver. In some embodiments, the memory 214 may store instructions and/or code of an operating system. The operation system can switch between a user mode and a kernel mode (shown by way of example in FIG. 5) depending on the type of process being executed. The operating system can be executed by the processor 212 to permit data exchanges between user objects such as application programs executed at the user mode and the computer hardware managed by kernel objects such as software drivers 331 executing in the kernel mode. Each mode has a portion of memory address space allocated for the loading of instructions or the like. The kernel objects can keep track of processes or process threads created by the execution of application programs of the user applications 321 executing in the user mode. In some embodiments, the user mode and kernel mode can be part of an anti-malware system. In particular, security software such as anti-malware software may be implemented in the user mode and/or kernel mode of the operating system to guard against such security threats, such as malware or the like. The user applications 321 can execute processes related to user interactions, while code executed in the software drivers 331, also referred to as kernel drivers or simply "drivers", may access to the computer components such as hardware resources and system data of the computing device 400.

Although not shown, the user mode and kernel mode objects can communicate via a bidirectional communication path, for example, described with reference to a data communication path 325 between a user mode and a kernel mode. The communication path 325 may include hardware, software, or a combination thereof, for example, an interface that presents a system API or the like of the kernel mode to the processes or threads of the application 321 executing in the user mode. The communication path 325 can permit data such as system calls, interrupts, etc. to be exchanged between the kernel space and user space of the operating system. In embodiments where a user application 321 includes or other communicates with security software, a user application 321 can be referred to as a security application. Here, a security program of the application 321 can perform a malware scan operation or the like where the application. 321 temporarily suspended or frozen by the software driver 331 and establishes whether the operation is permissible and protects the operating system against malicious interference by the user application 321 executing in the user mode. The result of the malware analysis can be sent in an instruction from the user application 321 to the software driver 331.

As described above, the software driver 331 does not wait indefinitely for an instruction from the user application 321 regarding an event placed on hold by the software driver 331. In doing so, the software driver 331 may apply a variable timeout 335, for example, which can replace an existing timeout or extend a predetermined time period 341 so that the software driver 331 waits longer for the instruction if the user application 321 requires additional time to take into account time-consuming operations. The software driver 331 may include a diner 339 that is activated when a kernel request for instruction 332 is generated and inactivated when an instruction is received from the user application 321 or the predetermined time period 341 is exceeded.

An intercept 336 can be made by a kernel driver and in some embodiments can perform a function in accordance with the instruction received from the user application 321 received by the software driver 331 due to a sufficient timeframe allotted according to the variable timeout 335. For example, a kernel driver may intercept various operations, for example, open, dose, read, write, and/or start operations. In doing so, the intercept may pause an operation. For example, when performing an operation including anti-malware software, the intercept 336 can pause the operation and request the user mode application for instructions regarding the event. When the kernel driver intercepts the operation, it sends details of the operation to the user mode component, for example, an operation reference ID 338, and waits for a reply from the user application 321. In some embodiments, the driver 331 waits for a default timeout. If no reply is received, then the kernel driver can perform a default action, which may include terminating, blocking, or allowing the event according to a predetermined rule or the like. An operation reference ID 338 can be generated and used by the driver 331 to identify the operation for use with the variable timeout 335. In this example, the driver 331 can send an operation ID with the event data. The user mode component can reply either with instructions within the default timeout, or with a request to change the timeout, e.g., increase or decrease the timeout value. In doing so, the driver 331 waits for the new timeout value. The event detector 340 can provide an event identification to identify the event to which the reply relates.

FIG. 4 depicts a method 400 for detecting malicious activity on a computing device, in accordance with some embodiments. The method 400 may be implemented by one or more of the devices, components, and/or systems shown in the accompanying figures, and is discussed by way of reference thereto. In describing the method 400, reference is made to components of the computing device 200 of FIG. 2 and contents of the computing device memory 214 of FIG. 3.

The method 400 begins at block 402, where the software driver 331 detects and informs the user application 321 of event-related operations performed on the computing device 200. For example, since processes that operate in the kernel mode 530 have direct access to hardware components, such as the keyboard, graphics controller, etc., the driver 331 can intercept events related to a file operation or the like such as a user interacting with the software of the computing device 400. In some embodiments, the user application 321 is part of an anti-malware system, software product, or the like for interacting with the software driver 331 for preventing security threats such as malware attacks against the computer. To prevent such security events, the user application 321 may generate an instruction requesting that an operation detected by the software driver 331 is carried out. In some embodiments, an operation relies on code executed by the user application 321 and intercepted by the software driver 331. In particular, the software driver 331 can intercept specific code executed in the user application 321. For example, one or more processors can perform operations executed on threads processed at the operating system. In another example, an event detector 340 may detect events related to programs running in the user application 321 and is detected by the software driver 331 as part of a known communication exchange where the user application 321 relies on the software driver 331 to access hardware resources for executing the application, file, or the like.

At block 404, the software driver 331 suspends the operation and transmits a request to the user application 321 for an instruction to perform an action regarding the operation, for example, to block the operation or allow the operation to proceed.

At block 406, the user application 321 assesses how long the operation will take. For example, the user application 321 may rely on the timeout rules 337, timers 339, and stored time periods 341 to estimate a processing time for performing the operation by requesting information from a user, for example, request a confirmation from a user regarding the operation. The user application 321 may acquire other information such as the size of an archive to estimate an amount of time for scanning the archive. In some embodiments, the user application 321 includes anti-malware code for performing an operation, which can provide time-related information such as predetermined time period values 341 used for estimating the operation processing time.

At block 408, the user application 321 transmits a variable timeout request to the software driver 331. The variable timeout request when processed by the software driver 331 permits the user application 321, for example, part of an anti-malware software product, sufficient time to perform a security operation such as malware detection and the like on the code of the operation currently suspended by the kernel mode 530.

At block 410, the reply from the user mode application 321 can change the current or default timeout value used by the kernel mode object, e.g., driver 331, according to a timeout rule 337 to establish a period of time when the software driver 331 can expect to receive an instruction from the user mode regarding an operation placed on hold by the software driver 331.

At block 412, the user application 321 transmits an instruction to the software driver 331 regarding an action to be taken against the operation currently on hold by the software driver 331. The variable timeout value 335 permits the user application 321 sufficient time to analyze the operation followed by the output of an instruction to the software driver 331 regarding an action to be taken against the operation. For example, the user application 321 may be part of an anti-malware system, software product, or the like, that is given sufficient time to analyze processes launched and temporarily suspended by the kernel driver 131 until the operation, e malware analysis, is completed and the user application 321 sends an instruction to the software driver 331 following the analysis.

At block 414, the software driver 331 carries out the action on the operation according to the received instruction.

In sum, the method 400 includes a user mode component that can send an initial response to a kernel mode component with the timeout value requesting a timeout change, which is followed by a second response with the actual instruction from the user mode for the kernel mode to block or allow the event currently on hold. In addition to the example applications described above, the method 400 can be implemented to data loss prevention or control applications. For example, if an event related to a file operation is intercepted by the driver, the event can be sent to a data control application in the user mode to determine whether the data is confidential. In some cases, the system can be configured to allow the user to decide whether to perform an action, i.e., block, allow, etc. Here, a longer than normal timeout allows the user to respond. In other cases, the data control application may itself determine that the file is not confidential and perform the action, i.e., block, allow, etc., without user involvement.

Figure 5:
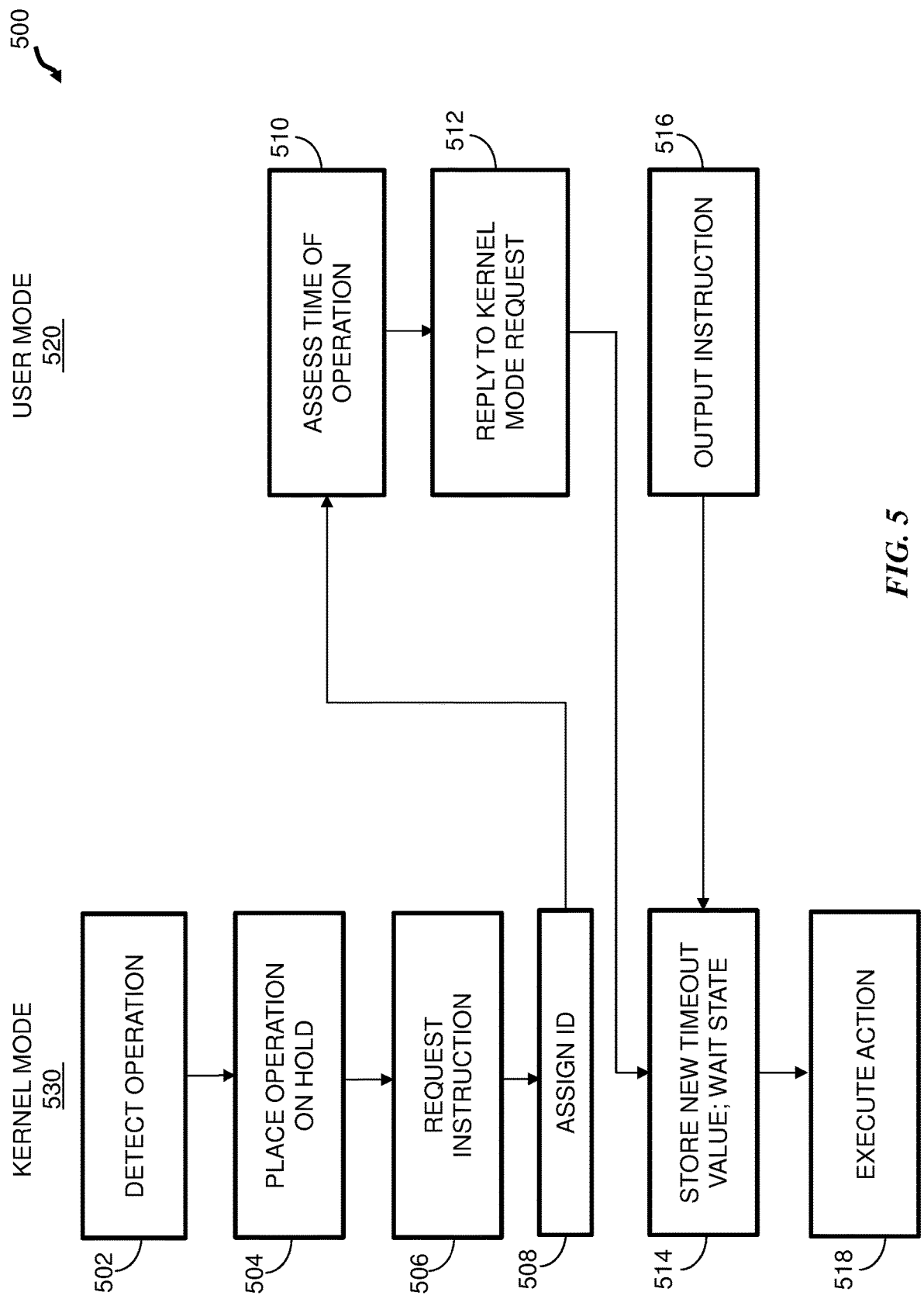
FIG. 5 depicts an electronic communication exchange between a user mode and a kernel mode, in accordance with an example embodiment.

FIG. 5 depicts a method 500 of an electronic communication exchange between a user mode component, e.g., a user application 321 of a user mode 520 and a kernel driver 331 of a kernel mode 530, in accordance with some embodiments. The method 500 may be implemented by one or more of the devices, components, and/or systems shown in the accompanying figures, and is discussed by way of reference thereto. In describing the method 500, reference is made to the computing device 200 of FIG. 2 and contents of the computing device memory 214 of FIG. 3.

At block 502, the kernel driver 331 detects an event-related operation on the computing device 200. Details of block 502 may be similar to those of block 402 of FIG. 4 and are not repeated for brevity. The user mode 520 may include an anti-malware application 321 or other software security tool to determine whether a process or thread of the event-related operation includes malicious code. The kernel driver 331 may detect new processes or threads and intercept events related to an operation of interest. For example, an event of a file operation intercepted by the kernel driver 331 can be output to the user application 321, for example, to determine whether the data is confidential, but not limited thereto. Therefore, other applications may equally apply.

At block 504, the kernel driver 331 suspends the operation while it waits for a decision from the user application 321 whether to allow or block the operation. The kernel driver 331 may suspend the operation according to one or more timeout rules 337. The kernel driver 331 is generally configured so that a user program must request the kernel mode 530 to access a hardware resource and that the kernel driver 331 interacts with the relevant hardware components on behalf of the user application 321. However, the kernel driver 331 may temporarily suspend an operation, for example, preventing the operation from accessing the hardware resource, until it receives an instruction from the user application 321 regarding an action to be taken against the suspended operation.

At block 506, the kernel driver 331 requests an instruction from the user mode 520. Other details of block 506 may be similar to those of block 404 of FIG. 4 and are not repeated for brevity. As shown in FIG. 3, the instruction request is output from the kernel mode 530 to a data communication path 325 between a user mode including the applications 321 and a kernel mode including the drivers 331. The communication path 325 can permit processes performing operations or the like to access the kernel mode 530. In some embodiments, the communication path 325 allows the software application 321 in the user mode 520 to instruct the kernel driver 331 to execute one or more functions. The communication path 325, which can be a bidirectional data path, may include one or more channels that allows the driver 331 operating in a kernel address space of memory to send data or software objects to an application operating in a user mode address space of memory.

At block 508, the kernel driver 331 assigns an operation reference identification (ID) 338 to the operation and outputs it to a user application 321 operating in the user mode 520 via the communication path 325 for processing. The operation reference ID 338 can be used by the kernel driver 331 to distinguish an event that has been suspended from other events and to identify the event when receiving replies from the user mode 520. Blocks 506 and 508 may be combined under a single step, for example, the event information can be sent with the instruction request and ID to the user mode component 520.

At block 510, the user mode component, e.g., user application 321, can perform one of several different steps. One possible step is for the user application 321 to perform a scan operation, which may include an analysis of unknown or suspicious code, for example, possible malware. In doing so, at block 512, the user application 321 can send a reply to the kernel driver 331 without requesting a change to the default timeout value. Optionally, the user application 321 can send a request to the kernel driver 331 to change the timeout value followed by a reply to the kernel mode request. The analysis may be performed in order to determine whether the user application 321 requires additional time (beyond the time permitted under the default timeout value) to complete the analysis. In some embodiments, at block 512, in the reply, the user application 321 can send a request to the kernel driver 331 to extend the timeout, which permits the user application 321 to complete the analysis. In other embodiments, the user application 321 can request to change the timeout immediately prior to the start of the analysis. In another embodiment, the default timeout value may be too long. Here, at block 512, the user application 321 can request a shorter timeout followed by the analysis. The user application 321 may rely on a start time, or the time that the kernel driver 331 sends the event to the user mode 520 for the default timeout. For subsequent timeouts, the start time may be the time the driver 331 receives a new timeout value from the user application 321. The user application 321 may receive at block 510 a system time from the kernel mode component 530 with the event information, which can be used by the user mode component 520 at block 510 to assess a time of operation.

More specifically, at block 512, the user mode component 520 can send a variable timeout request with a new timeout value 335 to the kernel driver 331. At block 514, the kernel driver 331 stores the new timeout value 335 and enters a wait state for one of two events: a user mode reply or a timeout expiration.

At block 516, the user application 321 outputs a reply, for example, an instruction within the timeframe allotted by the variable timeout. At block 518, the kernel driver 331 uses the operation reference ID 338 to retrieve the event, and to execute the action according to the instruction, and satisfies the wait state in block 514. If the wait state is not satisfied, then the timeout expires and a default action is performed at block 518.

Figure 6:
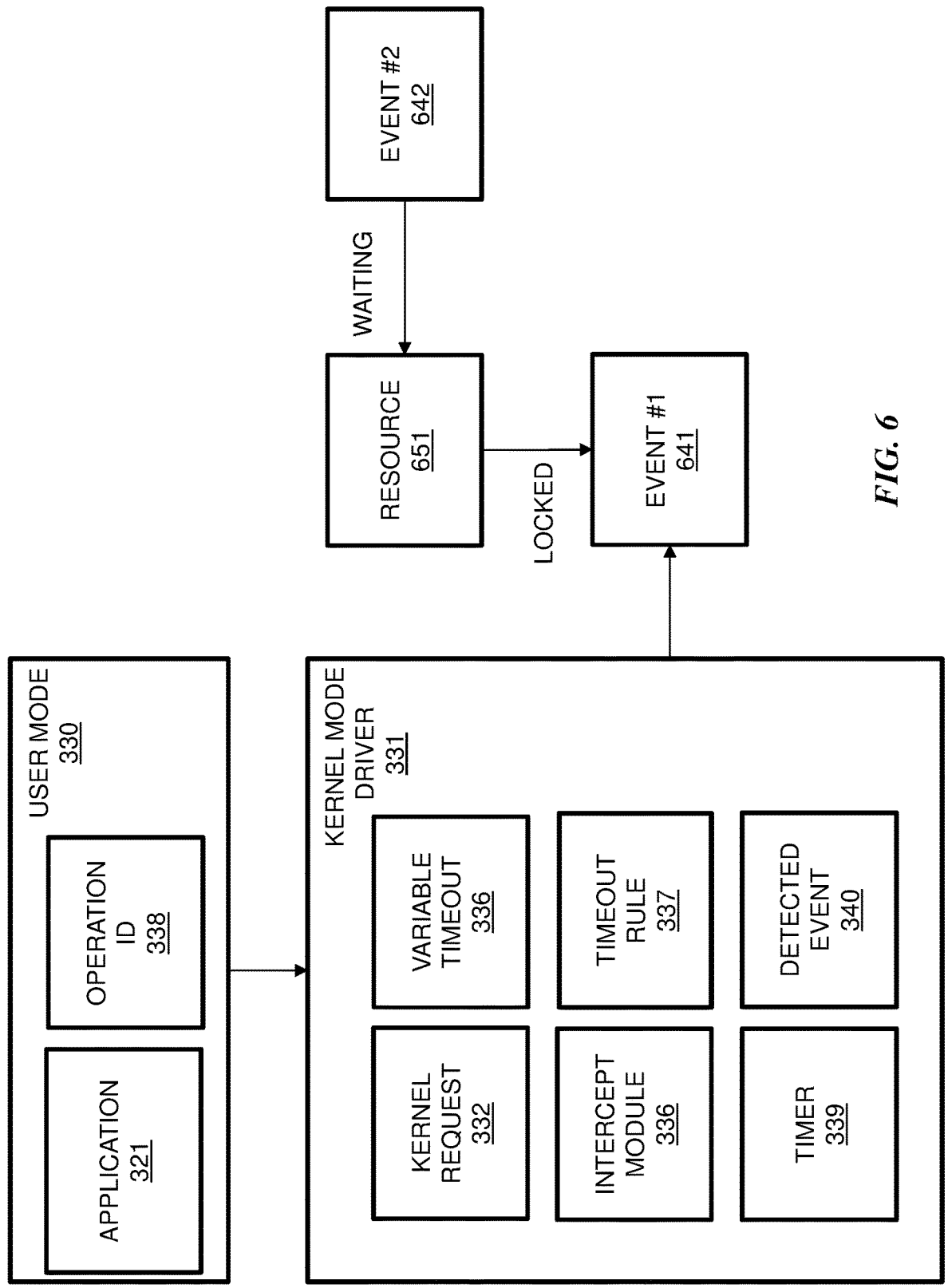
FIG. 6 depicts an operation performed by an operating system of a computing device, in accordance with an example embodiment.

FIG. 6 is a diagram illustrating an operation performed by the computing device 200 of FIGS. 2 and 3, in accordance with an example embodiment.

As described above, the kernel driver 331 does not wait indefinitely for an instruction from the user application 321 regarding an event detected by the event detector 340 and placed on hold by the kernel driver 331. In doing so, the kernel driver 331 may apply a variable timeout 335, for example, which can replace or extend an existing timeout, so that the kernel driver 331 waits longer for the instruction if the user application 321 requires additional time to take into account time-consuming operations. The timer 339 may be activated when a kernel request for instruction 332 is generated. The timer 339 may be inactivated when an instruction is received from the user application. 321 or the timeout 335 expires, i.e., exceeds the predetermined time period 341. The variable timeout 335 takes into account when the request is initiated so that a timeout event can occur if no response is received within the waiting period identified by the timeout value 335. A timeout that is too long can result in the computer locking up for significant period of time, if the user application 321 doesn't reply. For example, the computer may deadlock if the user application 321 causes a resource to be acquired and then indirectly causes a second event to occur which is intercepted by the kernel driver 331. The driver 331 then sends the second event to the user application 321. The user application 321 may not be able to proceed without acquiring the resource a second time and may not be able to do so if it is already held. A deadlock may be prevented by a reduced default timeout. If the user mode 520 recognizes that additional time is needed to complete an action, it can reset an insufficiently short default timeout value to a longer timeout value. This is preferable to a user application 331 where a long default timeout is used to accommodate a longest possible processing time, in which case the impact of deadlocks is more severe.

As previously described, the variable timeout 335 may be configured to be executed within a predetermined time period 341. If the time period 341 has expired or the instruction has been received, then the variable timeout 335 may be used to perform a predetermined action against the operation currently on hold according to a timeout rule 337. For example, when the driver 331 receives the new timeout, it completes a current wait and starts a new wait for either a reply from the user application 321 or in response to the time period established by the new timeout. The user application 321 can send a second update to the timeout 335. The driver 331 can wait for either a reply or a new timeout. The user application 321 can change the timeout value so long as the timeout has not expired. The driver 331 can perform an intercept-related function in accordance with the instruction received from the user application 321 received by the kernel driver 331 due to a sufficient timeframe allotted according to the variable timeout 335. For example, the driver 331 may terminate, block, or allow an event 64 land previously detected and intercepted the kernel driver 331. The thread corresponding to the event 641 can temporarily yield from execution. While waiting for an interaction with the user application 321, where the execution is delayed long enough for the user application 321 to analyze the operation and prior to this to determine an interval of time to be allotted so that the analysis can be performed.

The kernel driver 331 may process the variable timeout 335, which reduces a current timeout, or permits the current timeout to be configured short enough to prevent deadlock. For example, an operation may include a resource 651 locked by the user application 321. If the driver 331 sends a second event 642 but the user application 321 requires the same resource 6651 but cannot due to the first event 641, then a deadlock may occur. However, the variable timeout 336 may address this problem so that the driver 331 only waits for a predetermined time, whereby the deadlock is released. In particular, the variable timeout 336 is useful in applications where the default timeout is sufficiently short to limit the deadlock period.

As described above, the initial timeout value that is subject to modification or replacement by the variable timeout 335 is preferably short enough to prevent deadlock. However, a short timeout value may result in the user application 321 missing or misidentifying malware. Accordingly, in some embodiments, the variable timeout 335 may be increased to be greater than the initial timeout if an assessment is made by the user application 321 that the operation of interest can be performed in a timeframe greater than that established by the initial timeout. The timeout extension permits the kernel driver 331 to place an operation on hold for sufficient time so that a malware detection operation can be performed without the risk of deadlock.

Figure 7:
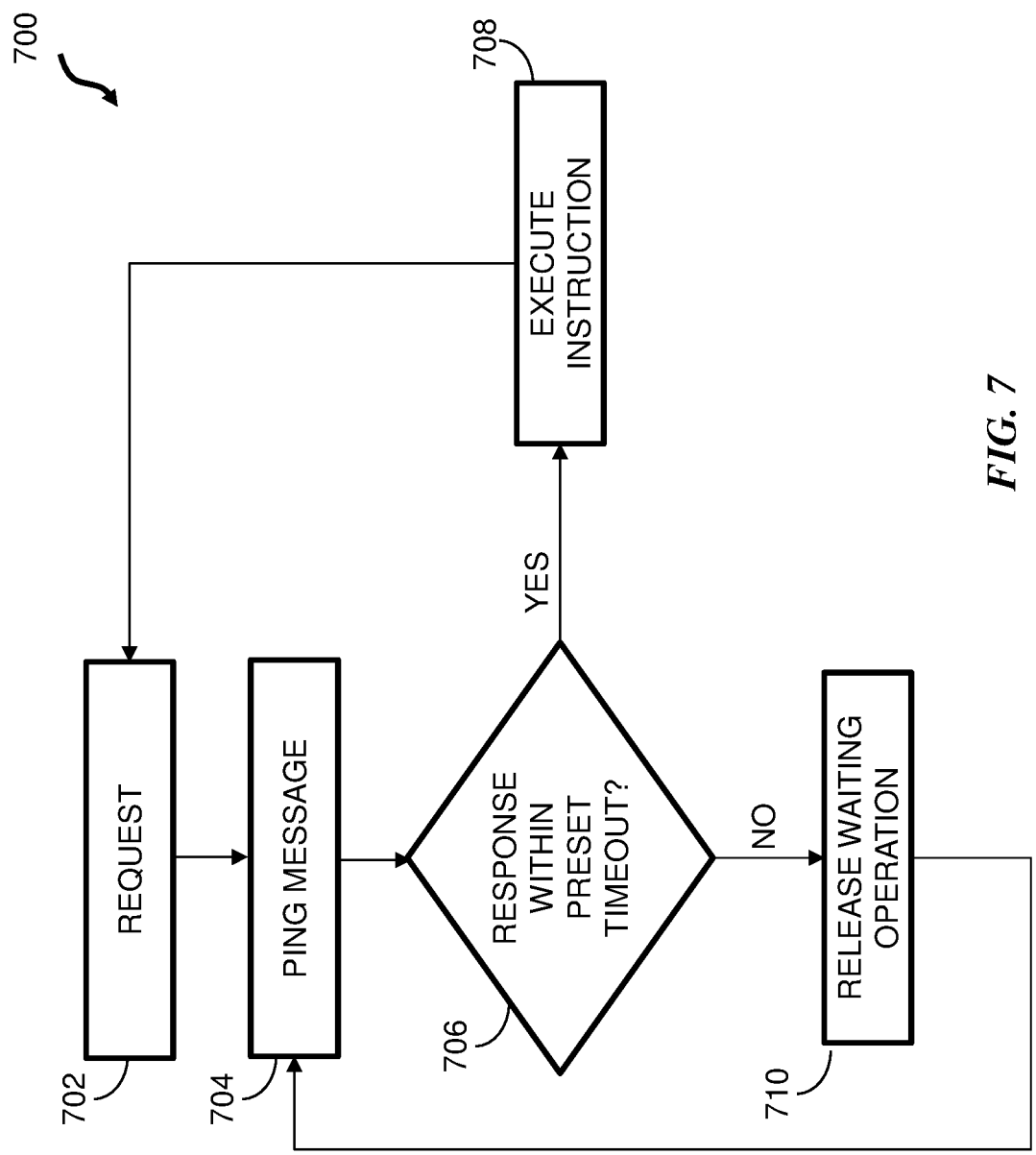
FIG. 7 depicts a method of data communication between a user mode and a kernel mode of an operating system of a computing device, in accordance with an example embodiment.

FIG. 7 depicts a communication exchange 700 between a user mode and a kernel mode of a computing device operating system, in accordance with an example embodiment. Referring again to FIGS. 2 and 3, the computer operating system may be so busy that the user application 321 cannot respond to a request 702 from the driver 331 regarding against an action to be taken against a current operation. For example, the application 321 may be frozen by the operating system 321 because the computer 400 is in a standby mode.

To address the foregoing, a message 704 such as a ping may be generated at and output from the kernel driver 331. The message 704 may be sent on a separate thread than the request 702. The kernel mode may start the timer 339 to determine whether the user application 321 replies to the ping message 704 within a predetermined period of time 341.

The predetermined period of time 341 is compared with a time determined by the timer 339. At decision diamond 706, in response to the comparison, if a determination is made by the kernel driver 331, for example, by executing a predetermined timeout rule 337, that the user application 321 responded to the ping message 704 within the predetermined period of time 341, which may be distinguished from the variable timeout described above, then the method 700 may proceed to block 708, where the kernel driver processes the response from the user application 321, which may include an instruction, a variable timeout 335, etc. The kernel driver 331 may also wait for another timeout from the user application, or monitor another operation, send another event request, and so on. The method 700 can then return to block 702, where the kernel driver 331 submits a new request to the kernel application or other user object of the user mode.

If, at decision diamond 706, a determination is made by the kernel driver 331 that the user application 321 did not respond to the ping message 704, then the method 700 proceeds to block 710, where the kernel driver 331 releases all waiting operations according to a predetermined policy, for example, whether to allow the operation to proceed or block the operation. The method 700 may return to block 704, where another ping message 704 is output by the kernel driver 331. Ping messages 704 can be output until the user application 321 recovers, e.g., removed from standby mode and/or the driver 331 provides an instruction for the kernel driver 331 to perform an action, i.e., block or allow the operation. In the latter case, if no instruction is received within a predetermined time period 341, the variable timeout 335 is activated and the driver 331 can perform a predetermined action on the operation.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes, systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policy to network traffic to prevent intrusion attempts to the containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for detecting malicious activity of a computing device, comprising:
   detecting, by a software driver executing within a kernel mode of an operating system being executed by the computing device, an operation performed at the computing device;
   intercepting, by the software driver, the operation;
   receiving, by a security application executing within a user mode of the operating system, a request from the software driver for an instruction for the software driver for an action to block or allow the operation according to a first timeout value, wherein the first timeout value is a default timeout value;
   generating, by the security application, a second timeout value based on an amount of time determined by the security application;
   transmitting, by the security application within the user mode, a reply to the request that includes a request to replace the default timeout value with the second timeout value to the software driver within the kernel mode,
   wherein the reply includes an identification value that associates the operation with the second timeout value, and wherein the kernel mode uses the identification value to retrieve at least one event of the operation;
   storing, at the kernel mode, the second timeout value;
   transmitting, by the security application, the instruction to the software driver in compliance with the second timeout value, wherein the second timeout value limits a deadlock period by the software driver processing the second timeout value; and
   executing, by the software driver, the action in response to the instruction.

2. The method of claim 1, wherein the security application determines whether the operation includes malicious activity.

3. The method of claim 1, wherein the amount of time to complete the operation is determined by an amount of processing time estimated to be performed on the operation by the security application.

4. The method of claim 1, further comprising:
   transmitting, by the software driver, a first event including a message to the security application;
   in response to a receipt of a reply message received in a second event including a third timeout value within a predetermined amount of time, waiting by the software driver for an instruction from the security application in compliance with the third timeout value; and
   in response to an absence of the receipt of the reply message within the predetermined amount of time, performing by the software driver a predetermined action on the operation.

5. The method of claim 1, further comprising:
   performing, by the software driver, a hold operation on the operation while waiting for either the instruction from the security application or an expiration of time including in the first timeout value; and
   releasing the operation from the hold operation in response to either a receipt of the instruction or the expiration of time.

6. The method of claim 1, wherein the second timeout value replaces or modifies the first timeout value.

7. A computer system, comprising:
   one or more processors; one or more memory devices coupled to the one or more processors contain program code executable by the one or more processors; and one or more computer readable storage devices coupled to the one or more processors, wherein the one or more storage devices contains program code executable by the one or more processors via the one or more memory devices to implement a method for detecting malicious activity of a computing device, comprising:

detecting, by a software driver executing within a kernel mode of an operating system being executed by the computing device, an operation performed at the computing device;

intercepting, by the software driver, the operation;

receiving, by a security application executing at a user mode of the computing device, a request from the kernel mode for an instruction for the software driver for an action to block or allow the operation according to a first timeout value, wherein the first timeout value is a default timeout value;

generating, by the security application, a second timeout value based on an amount of time determined by the security application;

transmitting, by the security application within the kernel mode, a reply to the request that includes a request to replace the default timeout value with the second timeout value to the software driver within the kernel mode, wherein the reply includes an identification value that associates the operation with the second timeout value, and wherein the kernel mode uses the identification value to retrieve at least one event of the operation;

storing, at the kernel mode, the second timeout value;

transmitting, by the security application, the instruction to the software driver in compliance with the second timeout value, wherein the second timeout value limits a deadlock period by the software driver processing the second timeout value; and executing, by the software driver, the action in response to the instruction.

8. The computer system of claim 7, wherein the security application determines whether code of the operation includes malicious activity.

9. The computer system of claim 7, wherein the amount of time to complete the operation is determined by an amount of processing time estimated to be performed on the operation by the security application.

10. The computer system of claim 7, wherein the one or more storage devices contains program code executable by the one or more processors via the one or more memory devices to implement the method for detecting malicious activity of the computing device further comprises:

transmitting, by the software driver, a first event including a message to the security application;

in response to a receipt of a reply message received in a second event including a third timeout value within a predetermined amount of time, waiting by the software driver for an instruction from the security application in compliance with the third timeout value; and in response to an absence of the receipt of the reply message within the predetermined amount of time, performing by the software driver a predetermined action on the operation.

11. The computer system of claim 7, wherein the one or more storage devices contains program code executable by the one or more processors via the one or more memory devices to implement the method for detecting malicious activity of the computing device further comprises:

performing, by the software driver, a hold operation on the operation while waiting for either the instruction from the security application or an expiration of time including in the first timeout value; and releasing the operation from the hold operation in response to either a receipt of the instruction or the expiration of time.

12. A computer program product for processing computer network traffic, the computer program product comprising:

one or more computer readable storage media having computer readable program code collectively stored on the one or more computer readable storage media, the computer readable program code being executed by one or more processors of a computer system to cause the computer system to perform a method for detecting malicious activity of a computing device, comprising:

detecting, by a software driver executing within a kernel mode of an operating system being executed by the computing device, an operation performed at the computing device;

intercepting, by the software driver, the operation;

receiving, by a security application executing within a user mode of the operating system, a request from the software driver for an instruction for the software driver for an action to block or allow the operation according to a first timeout value, wherein the first timeout value is a default timeout value;

generating, by the security application, a second timeout value based on an amount of time determined by the security application;

transmitting, by the security application within the user mode, a reply to the request that includes a request to replace the default timeout value with the second timeout value to the software driver within the kernel mode, wherein the reply includes an identification value that associates the operation with the second timeout value, and wherein the kernel mode uses the identification value to retrieve at least one event of the operation;

storing, at the kernel mode, the second timeout value;

transmitting, by the security application, the instruction to the software driver in compliance with the second timeout value, wherein the second timeout value limits a deadlock period by the software driver processing the second timeout value; and executing, by the software driver, the action in response to the instruction.

13. The computer program product of claim 12, wherein the amount of time to complete the operation is determined by an amount of processing time estimated to be performed on the operation by the security application.

14. The computer program product of claim 12, wherein the computer readable program code is executed by one or more processors of a computer system to cause the computer system to perform the method for detecting malicious activity of the computing device further comprises:

transmitting, by the software driver, a first event including a message to the security application;

in response to a receipt of a reply message received in a second event including a third timeout value within a predetermined amount of time, waiting by the software driver for an instruction from the security application in compliance with the third timeout value; and in response to an absence of the receipt of the reply message within the predetermined amount of time, performing by the software driver a predetermined action on the operation.

15. The computer program product of claim 12, wherein the computer readable program code is executed by one or more processors of a computer system to cause the computer system to perform the method for detecting malicious activity of the computing device further comprises:
  performing, by the software driver, a hold operation on the operation while waiting for either the instruction from the security application or an expiration of time including in the first timeout value; and
  releasing the operation from the hold operation in response to either a receipt of the instruction or the expiration of time.

* * * * *